United States Patent [19]

Larsson

[11] Patent Number: 5,472,729
[45] Date of Patent: Dec. 5, 1995

[54] METHOD FOR PRODUCING MARGARINE HAVING AN EXTRA LOW FAT CONTENT

[75] Inventor: Jan A. Larsson, Götene, Sweden

[73] Assignee: L & L International, Torsgatan, Sweden

[21] Appl. No.: 158,003

[22] Filed: Nov. 24, 1993

Related U.S. Application Data

[63] Continuation-in-part of Ser. No. 838,530, Feb. 19, 1992, abandoned.

[30]   Foreign Application Priority Data

Oct. 7, 1991 [SE] Sweden ................................. 9102899

[51] Int. Cl.⁶ .................................................. A23D 7/015
[52] U.S. Cl. ............................................. 426/603; 426/804
[58] Field of Search .................................. 426/601, 602, 426/804, 603

[56]   References Cited

U.S. PATENT DOCUMENTS

| | | | |
|---|---|---|---|
| 3,616,220 | 10/1971 | Nisbet . | |
| 3,966,990 | 6/1976 | Cremer | 426/549 |
| 4,452,978 | 6/1984 | Eastman | 426/549 |
| 4,510,166 | 4/1985 | Lenchin | 426/603 |
| 4,536,408 | 8/1985 | Morehouse . | |
| 4,869,919 | 9/1989 | Lowery | 426/603 |
| 4,885,180 | 12/1989 | Cochran | 426/549 |
| 4,954,178 | 9/1990 | Caton | 426/549 |
| 4,981,709 | 1/1991 | Furcsik | 426/602 |
| 4,990,355 | 2/1991 | Gupta | 426/602 |
| 5,094,872 | 3/1992 | Furcsik | 426/602 |
| 5,110,612 | 5/1992 | Quarles | 426/549 |
| 5,294,455 | 3/1994 | O'Brien | 426/603 |

OTHER PUBLICATIONS

Schwitzer 1956 Margarine Interscience Publishers, Inc. New York pp. 235–236, 256, 257, 263, 264, 265, 328, 329.
Whistler 1973 Industrial Gums Academic Press New York pp. 577, 578, 583.
Whistler 1984 Starch: Chemistry and Technology 2nd Edition Academic Press New York pp. 332–339.

*Primary Examiner*—Carolyn Paden

[57]   ABSTRACT

A method for the manufacture of an extra low calorie margarine, and a margarine produced according to said method is provided. The margarine has a fat content of between 15 and 38 percent by weight, whereby a water phase comprising starch having a viscosity of 100–800 cp, corresponding to a polymerization degree of more than 10.000, is solved in a liquid, is emulsified in a fat phase prepared from fats and/or oils and having an addition of 0.25–2 percent by weight as calculated on the ready margarine of an emulsifier to directly form a water-in-oil emulsion. The emulsion is pasteurized, cooled and packed. The special starch included in the water phase is pretreated in a first step by being acid-hydrolysis to reduce the viscosity of the starch. If necessary, in a second step, a functional group is introduced into the starch molecule for stabilizing the acid-hydrolyzed starch base, whereby the starch is made completely soluble in the water phase and can be heat treated and cooled without becoming gelified.

26 Claims, 1 Drawing Sheet

METHOD FOR PRODUCING MARGARINE HAVING AN EXTRA LOW FAT CONTENT

CROSS-REFERENCE TO RELATED APPLICATION

This application is a continuation in part of application Ser. No. 838,530, filed on Feb. 19, 1992, now abandoned.

BACKGROUND OF THE INVENTION

The present invention generally relates to a method of producing low calorie margarines having an extra low fat content, for instance a fat content 5 of between 15 and 38 percent by weight. The invention also relates to an extra low calorie margarine manufactured accordingly.

A method for the manufacture of such margarines is known from the Swedish patent 461.762 (corresponding to U.S. Pat. No. 4,978,554) in which method a protein containing water phase is emulsified in a fat phase to directly form a water-in-oil emulsion, which is pasteurized, cooled and packed, and in which the water phase is prepared:

- in a first stage, in that starch and an emulsifier are solved in skim milk, butter milk, whey, water or mixtures thereof, under stirring; the emulsifier in the water phase is used for preventing the starch from becoming gelified;
- in second stage, in that the starch-emulsifier solution is allowed to stand and swell and become "ripened" for some time, for instance for about 24 hours;
- and in a third stage in that the "ripened" starch-emulsifier solution is mixed with a protein concentrate from a milk product, with melting salts and with taste-giving substances to form a final water phase;
- whereupon the ready water phase is successively emulsified in a fat phase prepared in a conventional way;
- and the water-in-oil emulsion thereby formed is pasteurized, cooled and packed.

The said known method of manufacturing the extra low calorie margarine is expensive, there is a need for a special manufacturing equipment and a special plant for manufacturing same, and the process is rather complicated and time consuming.

The preparation and the handling of the protein material is expensive, since the preparation thereof necessitates a fermentation of the milk product and a precipitation and a separation of the protein. Also, there is a lack of protein on the market and therefore it would be good to reduce the amount of protein used for the manufacture of the actual margarine.

Further the handling of the starch is expensive depending on the time consuming and relatively complicated handling as far as to a ripened condition of the starch solution. In case of normal handling of highly concentrated starch there is a risk that the starch will gelified when a warm starch solution is being cooled, and this is not wanted. Thus, the starch solution is not "stable in solution". In the above mentioned known method such gelification is prevented in forming a starch lipid complex by adding emulsifiers of the monoglyceride type to the starch solution.

A process for producing a low fat spread is known from U.S. Pat. No. 4,536,408 (MOREHOUSEJ, in which there is used starch in the form of maltodextrine having a so called D.E. (dextrose equivalent) value of between 4 and 25, which corresponds to molecular weight of between about 650 and 4.050 and an average polymerization degree of between 4 and 25. By dextrose equivalent (D.E.) is meant the reducing ability of the starch as compared with that of pure dextrose. The D.E. value also is figure of the tendency of the starch to react with proteins. A low D.E. value means a low tendency of the starch to react with proteins.

Such a relatively high D.E. value is not very good for producing a low calorie spread in several respects. The starch has a tendency to gelified, in particular if the margarine is stored for some time, and a gelified margarine is considered useless; depending on the low polymerization degree the starch has a rather poor water binding ability, and therefore there is a need for adding a relatively high amount of starch in the margarine; there are generally difficulties in directly providing an emulsion of the water-in-oil type, and mainly it is necessary to first provide an o/w emulsion, which is cooled and is further worked until phase inversion occurs to the intended w/o emulsion; the high amount of starch gives the margarine a not wanted high nutritious value; the high amount of starch also gives the product a not wanted sweet taste; starch having a relatively high D.E. value may, in combination with protein in the margarine product, discolor the protein into a brownish color and may give the margarine an undesired disflavour.

Summarizing there has been a wish to reduce the number of persons needed for the manufacture of the margarine, and to be able to use a less skilled staff; to reduce the total handling time, to get a simpler and thereby cheaper handling process for the product; to reduce the necessary storing time and get reduced storing costs of the ingredients, in particular of the starch part thereof; to reduce the amount of protein used in the margarine; to avoid the use of emulsifiers in the water phase, and to reduce the waste material in the manufacture of the margarine.

It has proved possible to meet all of the above listed requirements by using a type of starch which is pre-treated in a factory, and which is used in the manufacture of the margarine in the dairy or the margarine factory without the need of further treating the starch.

SUMMARY OF THE INVENTION

Now it has been observed that it is possible, by a relatively simple process, to prepare a starch phase having a D.E. value of less than D.E. 0.01, corresponding to an average molecular weight of more than 1.6 million and a polymerization degree of more than 10.000. Such a starch phase solves all of the above mentioned lacks and disadvantages of the prior known extra low calorie margarines. Throughout the remainder of the specification said starch will be referred to as "special starch".

The process for preparing said "special starch" generally comprises an "acid-hydrolysating" of the starch in a water suspension, whereby the starch grains are being suspended (elutriated) in water, and the suspension is heated to a temperature which is less than the temperature, at which the starch grains pastify, whereby the molecular weight becomes reduced and the viscosity in a boiling solution is reduced. The starch pre-treated accordingly is totally soluble and no starch grains remain after the starch has been boiled.

For further "stabilizing" the acid-hydrolyzed starch a functional group is coupled to the starch molecule. It is thereby possible to obtain such stabilization that the starch does not gelify in the boiled starch solution, and it has thereby been made possible to strongly reduce or even completely eliminate the need of using a monoglycerid-emulsifier which was previously needed in the starch solution.

The "special starch" thereby formed is unique in that it has a heavy viscosity peak in the pastification moment, and thereafter the solution becomes thinner and more mobile. The starch in the solution does not gelify when the solution is cooled after the heat treatment. On the contrary the viscosity remains on a low level.

The special starch is very well suited for quick and simple manufacture of an extra low calorie margarine without any further treatment of the starch. By using said special starch it is possible to make margarines having fat contents down to as low as 10%, whereby the starch content of the product is between 5 and 13 percent by weight. If protein is added to the product the starch content can be kept as low as even down to 2 percent by weight (compare the following example 7).

Generally the extra low calorie margarine according to the invention lO is manufactured in five successive simple method steps, namely: I preparing the starch, II preparing the water phase, III preparing the fat phase, IV emulsifying the water phase in the fat phase and V final treatment.

DETAILED DESCRIPTION OF THE DRAWINGS

Figure 1:
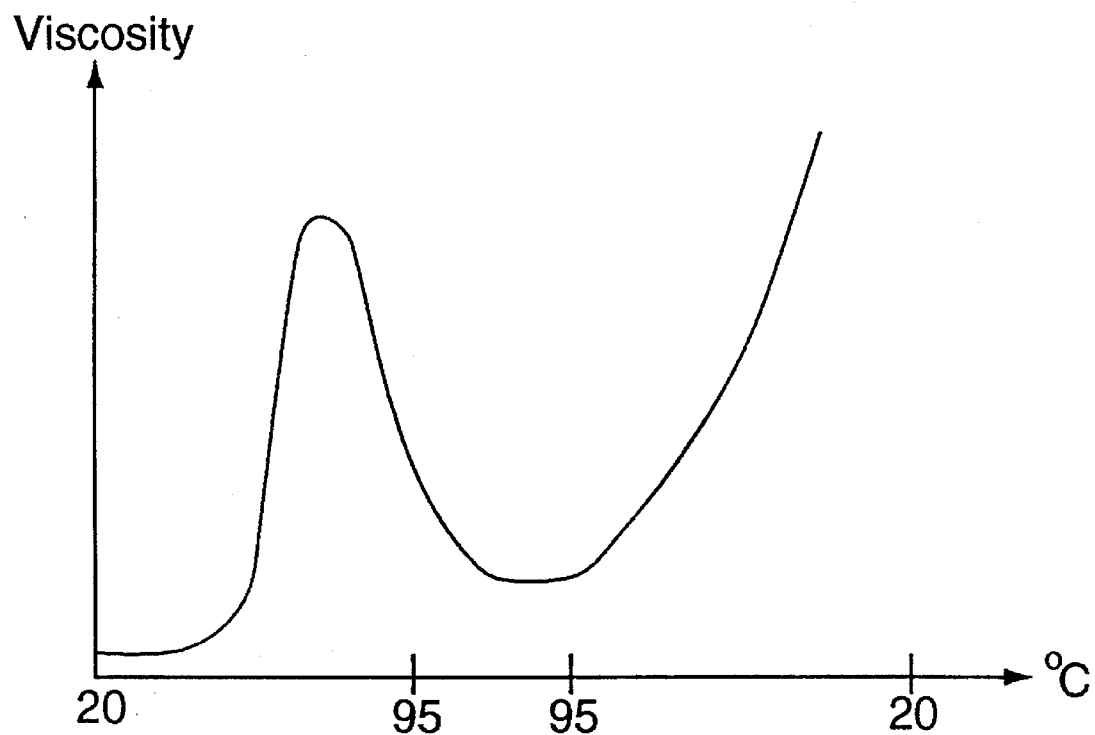
FIG. 1 of the drawings diagrammatically illustrates a viscosity/temperature curve for an acid-hydrolyzed, non-stable starch of the prior known type.
Figure 2:
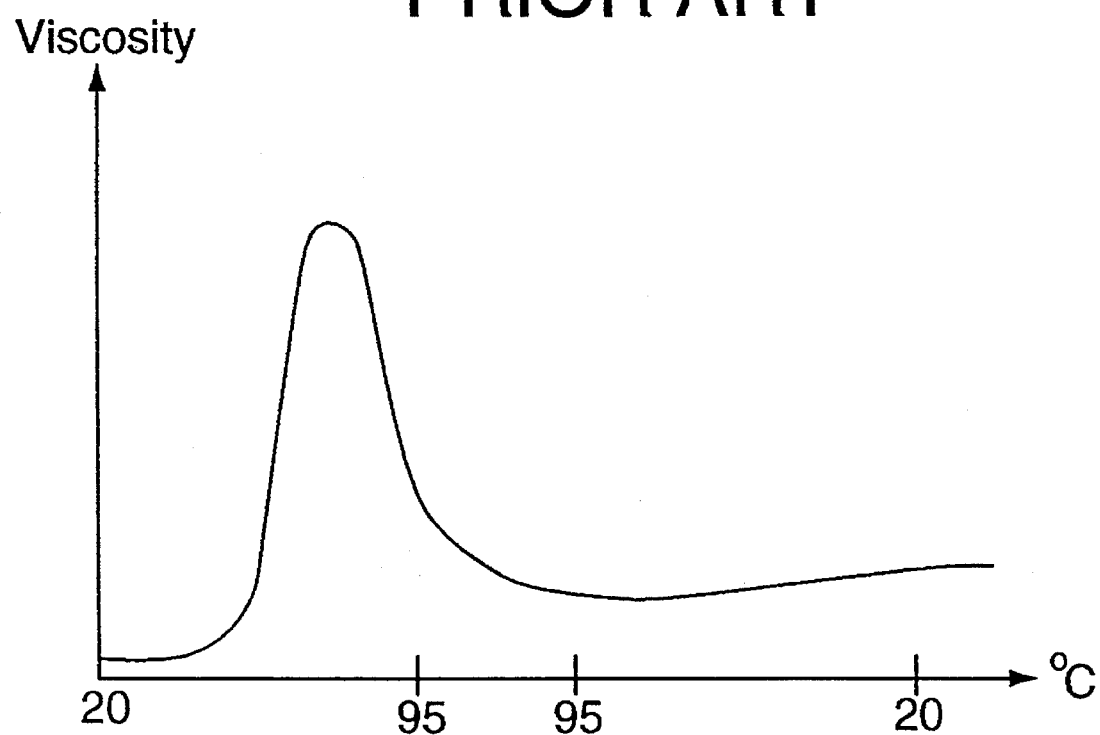
FIG. 2 of the drawings shows a corresponding viscosity/temperature curve for a starch prepared according to the invention, which starch is both acid-hydrolyzed and to which a functional group of the acetyl, hydroxi-propyl, 2-octenyl-succinyl etc. type has been added.

Referring to FIG. 1, it is evident that the viscosity of the prior art non-stabilized starch has a high peak but quickly decreases to a low viscosity level at a temperature of about 90°–95° C., but that the viscosity thereafter increases strongly to a high viscosity level when the temperature is lowered as far as to about room temperature. The reason for this is that the starch is normally not naturally stable. As stated above, FIG. 2 the drawings shows a corresponding viscosity/temperature curve for a starch prepared according to the invention, which starch is both acid-hydrolyzed and to which a functional group of the acetyl, hydroxi-propyl, 2-octenyl-succinyl etc. type has been added. It is evident from FIG. 2 that the viscosity for this type of starch remains on a surprisingly low level even after having been cooled to room temperature. This is a critical property for the invention which is used in the method according to the invention.

As previously mentioned there are certain starch types which are naturally stable, and for such starch types it is generally not necessary to add a functional group as mentioned above, generally referred to as the acetylation step.

To make it possible to use starch directly in a process using available equipment in the manufacture of margarine, the starch is pastified and dried on rollers, and for making it possible to simply disperse and solve the starch it is supplied in the form of small flakes.

In more detail, the "special starch" is prepared as follows:

(A) The "special starch" which is of interest in the present case is prepared in that starch grains, for instance potato starch or any other common type of starch, is suspended in diluted hydrochloric acid, or eventually sulfuric acid. Preferably the starch has a dry matter content of about 40%. The concentration of the acid is chosen so that the acidification of starch is fulfilled in a suitable period of time. The concentration may be between 1 and 10% by weight. It has been shown to be suitable to use hydrochloric acid having a concentration of about 1, 5 %.

(B) The starch suspension is stirred, whereupon it is allowed to stand for 3–5 hours. The hydrochloric acid makes the starch hydrolyze whereby the amylopectin of the starch is split into smaller parts. This is of critical importance for the succeeding use of the special starch for the production of the extra low calorie margarine.

(C) It is important to make sure that the D.E. value of the starch is low, in the present case less than D.E.=1, preferably even less than 0.01. This is most preferably made in that the viscosity of the starch is measured after the hydrolyzation step. By measuring the viscosity it is easy to calculate the average polymerization degree and the average molecular weight of the starch. The viscosity can be measured in the ready starch in a 10% solution in distilled water at a temperature of 50° C. with a Brookfield RVT apparatus, spindle 2 and 50 rpm. The viscosity of the starch should be between 100 and 800 cp, or most preferably between 250 and 400 cp. This viscosity corresponds to a polymerization degree of more than 10.000 and a molecular weight of the starch of more than 1.600.000. The acid hydrolyzation step is not interrupted until the starch has a viscosity in the preferred range of 100–800 cp.

(D) Preferably, but not necessarily, the excess of hydrochloric acid is washed out of the starch by means of excess of water. This is done to avoid having the starch turn gray colored, as may otherwise happen e.g. for potato starch.

(E) For preparing the starch for being stabilized by being "esterified" by means of an anhydridous reagent the starch solution is neutralized with sodium hydroxide so that the pH value at a temperature of 25° C. is 8–8.5 (at 40° C. about pH=7). Alternatively it is possible to stabilize the starch by a hydrozy-alkoxylation (etherifying) step, and for preparing the starch for such process the pH value of the starch is set to pH=11–12 and temperature of about 40°–50° C. The esterifying stabilization is made in that the starch solution gets a dosing of e.g. an acetic anhydride, a 2- oktenyl-succinic-anhydride or of pure succinic acid anhydride. Alternatively the starch can be alkoxylated by an addition of e.g. a hydroxy propyl group from propylene oxide. The dosage is made according to the maximum limits which are stipulated by FA0/WH0 and FDA for accepting of the starch as an additive for food stuffs. As mentioned above some starch types are naturally stable, and when using such starch types the "stabilization" step E can be excluded. Examples of such naturally stable starch types, for which the present stage D can be excluded are those types which are marketed under the English trade names Waxy Corn, Waxy Maize, Waxy Rice, Waxy Barley, Waxy Sorghum, etc.

(F) The pH value of the starch is adjusted to pH 5–7.

(G) Finally the starch is washed and dried. The ready special starch is soluble in hot water. If the starch solution is dried on hot rollers it is possible to get a starch which is soluble even in cold water. Preferable the starch is presented in the form of quickly soluble starch flakes.

As mentioned previously, the special starch thereby obtained is very well suited for quick and simple manufacture of an extra low calorie margarine without any further treatment of the starch. By using said special starch it is possible to make margarines having fat contents down to as low as 10%, whereby the starch content of the product is between 5 and 13 percent by weight. If protein is added to the product the starch content can be kept as low as even down to 2 percent by weight (compare the following example 7).

Generally the extra low calorie margarine according to the invention is manufactured in five successive simple method steps, namely: I preparing the starch, II preparing the water phase, III preparing the fat phase, IV emulsifying the water phase in the fat phase and V final treatment.

1. Preparing the starch

The "special starch" is prepared as disclosed above, whereby a starch phase is obtained having a D.E. value of less than 1.0, and even as low as 0.01, a polymerization degree of >10.000, a viscosity of 100–800 cp, or preferably 250–400 cp, and an average molecular weight of >1.600.000.

II. Preparing the water phase.

The special starch prepared as described above is in a simple method step solved in any type of liquid which can carry the aroma substances, for instance in water, skim milk, soured (cultured) milk, butter milk, whey, yogurt, low concentrated milk protein, soy protein or any other vegetable protein. The starch is preferably solved in a warm liquid, for instance a liquid having a temperature of 50°–70° C. The amount of starch in relation to liquid ought to be such that the dry matter content of the starch in the water phase, as calculated on the final product, is 8–15 percent by weight or preferably 10–12 percent by weight for a margarine having a fat content of 15–25 percent by weight. For margarines having a higher fat content the amount of starch can be reduced, for instance to a dry matter content of 6–12 or preferably 8–10 percent by weight for a margarine having 25–39 percent fat content. To the starch solution is added salt and aroma substances like butter aroma, and preservatives like potassium sorbate. Eventually, but not necessarily, also protein concentrate may be added. Thanks to the use of the above described "special starch" it is possible to make use of a very little amount of emulsifier, and even to avoid using an emulsifier, which was previously necessary, and this is due to the fact that the special starch itself prevents gelification. The temperature of the water phase is maintained at about 45°–60° C. so that it can immediately be emulsified in the fat phase.

III. Preparing the fat phase.

The fat phase is prepared, as known per se, from fats and/or oils of conventional type, which are mixed with each other at a temperature of 48°–65° C. To the liquid fats/oils is added 0.25–2% of a known emulsifier like a monoglyceride. The emulsifier has two functions, firstly to facilitate the emulsification and secondly to foresee that the products gets the desired fat crystal formation. To the warm fat phase is also added, if desired, small amounts of fat soluble vitamins and color substances like betacarotene. The temperature of the fat phase is maintained at about 48°–65° C.

IV. Emulsification.

The warm water phase (45°–60° C.) and the warm fat phase (48°–65° C.) can be emulsified either by, slowly and under intense working, pumping the water phase into the fat phase, or by emulsifying the water phase and the fat phase batchwise in mixing tanks, likewise under intense mechanical working. Generally it is preferred to slowly and successively dose the water phase into the fat phase for margarines having fat contents within the low fat area, e.g. fat contents of 15–25, whereas the batchwise process can be used for emulsification of the water and fat phases at higher fat contents of e.g. 25–38%.

V. Final treatment.

The emulsion that formed under point IV is pasteurized, for instance by being pumped through scraper pasteurizing apparatus, whereby the product is heated to a pasteurization temperature of 80°–85° C., whereafter it is quickly cooled to 15°–10° C. by being passed through a scraper heat exchanger of known type. After the margarine has been cooled it is worked in a working step and is packed as known per se.

In the following there will be given a number of examples on the manufacture of margarines having fat contents as low as between 15 and 8 percent by weight. In all examples there is used the "special starch" described above, and it is simply referred to the above process steps A–F as concerns the manufacture of the "special starch".

EXAMPLE 1

(25% fat content)

PREPARING THE WATER PHASE 18.8 kg butter milk was neutralized and was heated to 60° C. In the warm milk was solved 3.3 kg of the above described acid hydrolyzed and acetylated "special starch" under intense stirring. To the solution was added 0.4 kg common salt (NaCl) and a little amount of a water soluble aroma substance, for instance some type of cultured milk distillate, for taste reasons of the product, and 0.01 kg potassium sorbate as a preservative. The solution was allowed to stand at maintained temperature for about an hour, during which period the solution was stirred, and thereafter there appeared a quite smooth product without any air content. Water was added so that the total weight was 22.5 kg.

PREPARING THE FAT PHASE 7.1 kg butter oil was heated to 65° C., and to the warm butter oil was added 0.3 kg emulsifier of the monoglyceride type, a coloring substance in a solution form, for instance butter color or betacarotene, vitamins and fat soluble aroma, for instance Alvetto. The total weight of the fat phase was 7.5 kg.

EMULSIFICATION

The fat phase was transferred to an emulsification tank having a stirring mill which can be rotated at variable speeds. To the warm fat phase 30 (65° C.) was successively added the warm water phase (60° C.). The stirring mill was operated at an optimum speed while the water phase was mixed into the fat phase. Said optimum speed is a speed at which no air is introduced in the emulsion, but the speed is still so high that a perfect emulsion of the type water-in-oil (W/O) is obtained. The total weight of the emulsion was 22.5+7.5=30 kg.

FINAL TREATMENT

The emulsion was pasteurized by being pumped through a scraper pasteurizing unit, whereby the emulsion was heated to 80°–85° C., whereupon the emulsion was quickly cooled to 15°–10° C. by a known technique, by means of a scraper heat exchanger. The margarine was finally worked in a working step and was thereafter packed.

CONCLUSION/JUDGMENT

The margarine obtained by the process had an emulsion of the type water-in-oil, and it had a fat content of only 25%. The margarine could be made a W/O emulsion and could be pasteurized and cooled thanks to the presence of the new type of starch, the "special starch" described above, solved in neutralized butter milk. A skilled sample panel judged the taste of the margarine to 4.2 of a 5-grade scale, and the consistency of the margarine was judged 4.1.

EXAMPLE 2

(15% fat content)

PREPARING THE WATER PHASE 3.8 kg of the above described special starch was solved under intense stirring in 20.9 kg skim milk heated to 55° C. For taste giving purposes there was added to the solution 0.5 kg common salt and a little amount of a water soluble aroma of known standard type, and in addition thereto was added 0.02 kg potassium sorbate as a preservative. The solution was stirred for about 2 hours in warm condition, after the lapse which period a quite smooth solution without any admixture of air had been obtained. Water was added so that the total weight was 25.2 kg.

PREPARING THE FAT PHASE 3.6 kg butter oil was heated to 65° C., and to the warm butter oil was added 0.6 kg emulsifier of the monoglyceride type, a coloring solution, vitamins and fat soluble aroma substances. The total weight of the fat phase was 4.5 kg.

EMULSIFICATION

The fat phase was transferred to an emulsification tank having a variable speed stirring mill and into the warm fat phase the warm water phase was successively admixed while the stirring mill was run at optimum speed, which is such high speed that a perfect emulsion of the water-in-oil type is obtained during the entire admixture time without any air being introduced in the emulsion. The total weight of the emulsion was 30 kg. Depending on the extremely low fat content (15%) it was necessary to add the water phase extremely slowly.

FINAL TREATMENT

The above formed emulsion was pasteurized by being pumped through a scraper pasteurizing unit, in which the emulsion was heated to 82°–85° C., whereupon it was quickly cooled to 15°–13° C. by known techniques on a scraper heat exchanger. After the final treatment the margarine was packed.

CONCLUSION/JUDGMENT

A margarine of the water-in-oil type having only 15% fat content could be made according to the present example by a mixing, pasteurization and a cooling process. This was possible since the water phase contained the above new special starch solved in skim milk. A skilled sample/judgement panel judged the margarine having a taste of 3.8 on a 5-grade scale, and the consistency was judged to 3.7 according to the stone scale. Depending on the extremely low fat content of the margarine it was difficult to get high evaluation points as concerns taste and consistency.

EXAMPLE 3

(38% fat content)

PREPARING THE WATER PHASE 15.4 kg neutralized butter milk was heated to 58° C. and 2.7 kg of the above mentioned special starch was solved in said warm butter milk under intense stirring. For taste reasons 0.6 kg common salt and a little amount of water soluble aroma substances were added to the solution, and 0.01 kg potassium sorbate was added as a preservative. The solution was stirred for about 1 hour at maintained temperature, after the lapse of which period a quite smooth solution without any admixture of air had been obtained. Water was added to a total weight of 18.6 kg.

PREPARING THE FAT PHASE 6.4 kg butter oil was heated to 65° C. and 0.075 kg of a monoglyceride emulsifier was added to the butter oil. Further, there was added a coloring solution, vitamins and small amounts of fat soluble aroma substances. Finally sunflower oil was added so that the final weight of the fat phase was 11.4 kg.

EMULSIFICATION

The fat phase was transferred to an emulsification tank having a variable speed stirring mill. The warm water phase was successively mixed into the warm fat phase. The stirring mill was run at optimum speed during the mixing of the water phase into the fat phase, which speed is such that there is no admixture of air but which is still so high that a quite acceptable emulsion of the type water in oil is obtained during the entire period at which the water phase is mixed into the fat phase. The temperature of the emulsion was kept at 47° C. The total weight of the emulsion was 30 kg.

FINAL TREATMENT

The emulsion was pasteurized on a scraper pasteurizing apparatus at a temperature of 87°–90° C., whereafter the emulsion was quickly cooled to 11°– 9° C. by being passed through a scraper heat exchanger according to known techniques. Finally the margarine was worked and packed.

CONCLUSION/JUDGMENT

It was established that the emulsion of the product was of the type water in oil and that the product had a fat content of 38%. There were no problems in forming the emulsion thanks to the presence of the actual special starch solved in neutralized buttermilk. A skilled taste sample/judgment panel concluded that the product had a taste of 4.3 according to a 5-grade scale and a consistency of 4.4 according to the same scale. The margarine had a fresh buttermilk taste but was judged slightly too salty.

For considering the influence of the liquid in which the special starch of the water phase is solved the following examples 4 and 5 were made.

EXAMPLE 4

(27% fat content)

PREPARING THE WATER PHASE

A water phase was prepared by solving 3.9 kg special starch in 17.6 kg neutralized yogurt heated to a temperature of 60° C. under intense stirring. To the solution was added 0.4 kg common salt and a slight amount of water soluble aroma substances, and also 0.01 kg potassium sorbate as a preservative. The solution was stirred for about 30 minutes, whereafter water was added so that the total weight of the water phase was 21.9 kg.

PREPARING THE FAT PHASE

The fat phase was prepared by 7.0 kg butter oil which was heated to 65° C. and to which was added 0.2 kg of an emulsifier of the monoglyceride type, a coloring solution, vitamins and fat soluble aroma substances. Soy oil was added so that the total weight of the fat phase was 8.1 kg.

EMULSIFICATION

The warm water phase was mixed into the warm fat phase as mentioned in previous examples and a total weight of 30 kg emulsion was obtained.

FINAL TREATMENT

The margarine was pasteurized, quick-cooled, worked and packed like in previous examples.

CONCLUSION/JUDGMENT

The margarine was of the type W/O and had a fat content of 27%. The taste was judged to 4.1 and the consistency to 4.3 of a 5-grade scale. The yogurt taste was to some extent left in the ready product. The relatively high evaluation of the consistency depends on the content of soy oil which content was about 12% of the total fat content.

EXAMPLE 5

(30% fat content)

PREPARING THE WATER PHASE

A water phase was prepared by solving 3.1 kg special starch under intense stirring in 17.5 kg neutralized cheese whey heated to 60° C. To the solution was added 0.4 kg common salt and a little amount of water soluble aroma substances, and 0.01 kg potassium sorbate as a preservative. The solution was stirred for about 1 hour, whereby a smooth and air-free solution was obtained. Water was added so that the total weight of the water phase was 21.0 kg. The temperature was set to 60° C.

PREPARING THE FAT PHASE

The fat phase was prepared from 6.4 kg butter oil which was heated to 65° C. and to which was added 0.2 kg emulsifier in the form of a monoglyceride, a coloring solution, vitamins and fat soluble aroma substances. Sunflower oil was added so that the total weight of the fat phase was 9.0 kg.

EMULSIFICATION

The water phase was mixed into the fat phase like in the previous examples, and a total weight of 30 kg emulsion was obtained.

FINAL TREATMENT

The margarine was pasteurized at 86°–88° C. and was thereafter quickly cooled, worked and packed like in the previous examples.

CONCLUSION/JUDGMENT

The margarine was of the type W/O and had a fat content of 30%. The taste was judged to 4.0 and the consistency to 4.2 on a 5-grade scale. The cheese whey taste to some extent remained in the final product.

EXAMPLE 6

(38% fat content)

PREPARING THE WATER PHASE

A water phase was prepared in that 2.7 kg special starch was solved under intense stirring in 15.4 kg neutralized buttermilk heated to 58° C. To the solution was added 0.4 kg common salt and a little amount of water soluble aroma substances, and 0.01 kg potassium sorbate as a preservative. The solution was stirred for about 1 hour, whereafter a smooth and air-free solution had been obtained. Water was added so that the total weight of the water phase was 18.6 kg.

PREPARING THE FAT PHASE

The fat phase was prepared like in example 3 from 6.4 kg butter oil which was heated to 65° C., but to the melted fat was in this case added only 0.025 kg of a monoglyceride emulsifier, corresponding to only 0.08% emulsifier as calculated on the final product. A color solution, vitamins and fat soluble aroma substances were added. Further, sunflower oil was added so that the total weight of the fat phase was 11.4 kg.

EMULSIFICATION

The water phase was mixed into the fat phase like in the previous examples, and a total weight of 30 kg emulsion having a temperature of 47° C. was obtained.

FINAL TREATMENT

The margarine was pasteurized at 87°–90° C. and was quickly cooled, and was worked and packed like in the previous examples.

CONCLUSION/JUDGMENT

The margarine was of the type W/O and had a fat content of 38%. The taste was judged to 4.3 and the consistency to 2.4 of a 5-grade scale. The margarine had a fresh buttermilk taste, but after having been stored for some time it proved to have developed a grainy consistency depending on the low amount of emulsifier, which gave the product a defective fat crystal formation resulting in the low evaluation of the consistency. This example shows that there is a lower limit for the amount of added emulsifier, which in this case corresponds to only 0.08% emulsifier as calculated on the final product.

Resulting from a set of tests with manufacture of the same product but having a successively increased amount of emulsifier, it proved that a quite satisfactory fat crystal formation was not observed until the amount of emulsifier came close to 0.25% as calculated on the final product.

For judging the influence of a further increasing amount of emulsifier a set of tests were made with manufactures of the same product, whereby it proved that the amount of emulsifier, without detrimental influencing the product but also without any remarkable improvement of the product could be increased up to about 2% as calculated on the final product. At said high value the viscosity was growing so high that is was difficult to handle and to pump the product. Therefore it could be considered that the upper limit for the amount of added emulsifier was reached at about 2% addition of emulsifier. Empirically it could be established that the necessary amount of the emulsifier addition for obtaining a good final product decreases at an increasing fat content, and that the need of emulsifier at a fat content of 38% is only 5–10% of the necessary amount of emulsifier for margarines having a fat content of as low as about 15%.

For judging the influence of the added amount of special starch the following examples 7 and 8 were made.

EXAMPLE 7

(38% fat content)

PREPARING THE WATER PHASE

A water phase was prepared in that 0.6 kg special starch was solved under intense stirring in 17 kg of a protein solution from buttermilk heated to 58° C. The protein content of the solution was 13%. To the starch/buttermilk solution was added 0.5 kg common salt and a slight amount of water soluble aroma substances, and 0.01 kg potassium sorbate as a preservative. The solution was stirred for about 1 hour, whereafter a smooth and air-free solution was present. Water was added so that the total weight of the water phase was 18.6 kg after the pH had been set to 6.3 by an addition of melting salts of the type Na-phosphates and Na-citrates. The final temperature of the water phase was 48° C.

PREPARING THE FAT PHASE

The fat phase was prepared like in the above example 6 from 6.4 kg butter oil heated to 65° C. To the melted fat was added 0.075 kg of a monoglyceride emulsifier, corresponding to only 0.25 % emulsifier as calculated on the final product. Further there was added a color solution, vitamins and fat soluble aroma substances. Sunflower oil was added so that the total weight of the fat phase was 11.4 Icg.

EMULSIFICATION

The water phase was mixed into the fat phase like the previous examples. In total 30 kg emulsion having a temperature of 49° C. was obtained.

FINAL TREATMENT

The margarine was pasteurized at 87°–90° C. and was quickly cooled, and was worked and packed like in the previous examples.

CONCLUSION/JUDGMENT

The margarine was of the type W/O and had a fat content of 38%. The taste was judged to 4.4 and the consistency to 4.4 of a 5-grade scale. The margarine had a fresh buttermilk taste and a good consistency.

EXAMPLE 8

(38% fat content)

PREPARING THE WATER PHASE

A water phase was prepared in that 2.0 kg special starch was solved under intense stirring in 13.9 kg of a protein concentrate from skim milk heated to 58° C. The protein content of the solution was 10%. To the solution was added 0.5 kg common salt and a slight amount of water soluble aroma substances, and 0.01 kg potassium sorbate as a preservative. The solution was stirred for about 3 hours, whereafter a smooth and air-free solution was present. Water was added so that the total weight of the water phase was 18.6 kg. The final temperature of the water phase was 48° C.

PREPARING THE FAT PHASE

The fat phase was prepared like in the above example 7 from 6.4 kg butter oil, which was heated to 65° C. To the melted fat was added 0.075 kg of a monoglyceride emulsifier, corresponding to only 0.25% emulsifier as calculated on the final product. A color solution, vitamins and fat soluble aroma substances were added. Further rape oil was added so that the total weight of the fat phase was 11.4 kg.

EMULSIFICATION

The water phase was mixed into the fat phase like in the previous examples and a total weight of 30 kg emulsion having a temperature of 49° C. was obtained.

FINAL TREATMENT

The margarine was pasteurized at 87°–90° C. and was thereafter quickly cooled, worked and packed like in the previous examples.

CONCLUSION/JUDGMENT

The margarine was of the type W/O and had a fat content of 38%. The taste was judged to 4.4 and the consistency to 4.4 of a 5-grade scale. The margarine had a fresh skim milk taste and a good consistency.

The following examples 9 and 10 are intended to show that there is an upper limit for the addition of the special starch.

EXAMPLE 9

(15% fat content)

PREPARING THE WATER PHASE

A water phase was prepared in that 4.5 kg of the special starch was solved under intense stirring in 20.5 kg skim milk heated to 58° C. To the solution was added 0.5 kg common salt, a little amount of water soluble aroma substances, and 0.02 kg potassium sorbate as a preservative. The solution was stirred for about 1 hour, whereafter a smooth and air-free solution was present. Water was added so that the total weight of the water phase was 25.5 kg. The water phase was very thick.

PREPARING THE FAT PHASE

The fat phase was prepared like in example 2 from 3.6 kg butter oil heated to 65° C. To the melted fat was added 0.6 kg of a monoglyceride emulsifier, corresponding to only 2% emulsifier as calculated on the final product. Further a color solution, vitamins and fat soluble aroma substances were added, and finally rape oil was added so that the total weight of the fat phase was 4.5 kg.

EMULSIFICATION

The water phase was mixed into the fat phase like in the previous examples and there was obtained a total weight of 30 kg emulsion having a temperature of 49° C. Due to the extremely low fat content it was necessary to add the water phase extremely slowly.

FINAL TREATMENT

The margarine was pasteurized at 82°–85° C. and was cooled quickly, was worked and was packed like in the previous examples.

CONCLUSION/JUDGMENT

The margarine was of the type W/O and had a fat content of only 15%. The taste was judged to 3.5 and the consistency to 3.2 of a 5-grade scale. The margarine had a rather thick consistency.

EXAMPLE 10

(15% fat content)

PREPARING THE WATER PHASE

A water phase was prepared in the 5.1 kg of the special starch was solved under intense stirring in 20.0 kg skim milk heated to 58° C. To the solution was added 0.4 kg common salt and a little amount of water soluble aroma substances, and 0.03 kg potassium sorbate as a preservative. The solution was stirred at maintained temperature for about 2 hours, whereafter smooth and air-free solution was present. Water was added so that the total weight of the water phase was 25.5 kg. The water phase was very thick even at such high temperature as 65° C.

PREPARING THE FAT PHASE

The fat phase was prepared like in example 9 from 3.6 kg butter oil heated to 65° C. To the melted fat was added 0.6 kg of a monoglyceride emulsifier, corresponding to only 0.25% emulsifier as calculated on the final product. Further there was added a color solution, vitamins and fat soluble aroma substances. Rape oil was finally added so that the total weight of the fat phase was 4.5 kg.

EMULSIFICATION

The water phase was mixed into the fat phase like in the above examples, and a total weight of 30 kg emulsion having a temperature of 49° C. was obtained. Due to the extremely low fat content it was necessary to add the water phase extremely slowly.

FINAL TREATMENT

It was not possible to pasteurize and cool the product since it had a too high viscosity for being pumped through the scraper pasteurizing unit and the heat exchanger.

CONCLUSION/JUDGMENT

The example 10 shows that it was not possible to obtain a margarine since the water phase had a too high viscosity and this in turn is depending on the high amount of special starch added to the water phase, which amount corresponds to 17% of the total weight of the water phase and the fat phase.

For judging the influence of the liquid in which the "special starch" is solved the following example 11 was conducted.

EXAMPLE 11

(25% fat content)

PREPARING THE WATER PHASE 4.2 kg special starch was solved under intense stirring in 17.8 kg plain water having a temperature of 55° C. To the solution was added 0.4 kg salt and a slight amount of water soluble aroma substances and 0.01 kg potassium sorbate as a preservative. An additional amount of water was added so that the total weight of the water phase was 22.5 kg. The solution was allowed to stand, under soft stirring, for about an hour.

PREPARING THE FAT PHASE 7.35 kg butter oil was heated to 65° C., and to the warm butter oil was added 0.15 kg of a monoglyceride emulsifier, a coloring substance, minor amounts of vitamins and fat soluble aroma substances. The total weight of the fat phase was 7.5 kg.

EMULSIFICATION

The warm water phase (55° C.) was successively sprayed into the warm fat phase –65° C.J in a stirring mill, and the stirring mill was operated as in example 1.

FINAL TREATMENT

The emulsion was pasteurized like in previous examples and was cooled to 15°–10° C., and it was finally worked and packed.

CONCLUSION/JUDGMENT

It was concluded that is was fully possible to produce a margarine even without the use of a protein containing liquid, having a fat content of 25% and based only on plain water as the liquid of the water phase. A taste panel judged the taste to be 2.0 and the consistency was judged to 3.5 on a 5-degree scale. The margarine had a rather thick consistency.

| COMPILATION OF EXAMPLES | | | | | | |
|---|---|---|---|---|---|---|
| Example | Fat content | Starch | | Emulsifier | Judgement (5) | |
| nr | % in total | solved in | % in total | % in total | taste | consist. |
| 1 | 25 | butter milk | 11 | 1.0 | 4.2 | 4.1 |
| 2 | 15 | skim milk | 12.7 | 2.0 | 3.8 | 3.7 |
| 3 | 38 | butter milk | 9 | 0.25 | 4.3 | 4.4 |
| 4 | 27 | yogurt | 10 | 0.7 | 4.1 | 4.3 |
| 5 | 30 | cheese whey | 10.3 | 0.7 | 4.0 | 4.2 |
| 6 | 38 | butter milk | 9 | 0.08 | 4.3 | 2.4 |
| 7 | 38 | but.m.prot. | 2 | 0.25 | 4.4 | 4.4 |
| 8 | 38 | sk.m.prot | 6.7 | 0.25 | 4.3 | 4.4 |

-continued

COMPILATION OF EXAMPLES

| Example nr | Fat content % in total | Starch solved in | % in total | Emulsifier % in total | Judgement (5) taste | consist. |
|---|---|---|---|---|---|---|
| 9 | 15 | skim milk | 15 | 2.0 | 3.5 | 3.2 |
| 10 | 15 | skim milk | 17 | 2.0 | — | — |
| 11 | 25 | water | 18.9 | 0.5 | 2.0 | 3.5 |

I claim:

1. A method for the manufacture of an extra low-calorie margarine having a fat content of between 15–38% by weight as calculated on the final product, said method comprising the steps of:

(a) pretreating starch to a state in which the starch does not gel and wherein the starch has a D.E. value of less than 1, said pretreating step including the substeps of:

(1) forming a starch suspension by suspending starch grains in a diluted acid;

(2) stirring the starch suspension;

(3) allowing the starch suspension to stand a sufficient time to permit the viscosity of the starch to reach a value of less than 800 cp;

(4) checking the acidification of the starch and breaking the acidification when the starch has a viscosity of less than 800 cp;

(5) stabilizing the starch by an esterification process wherein an acetyl group, a 2-olctenylsuccinyl group or a succinyl group is coupled to the starch or by a hydroxyl-alkoxylation process wherein a hydroxypropyl group is coupled to the starch;

(6) treating the starch with a base to adjust the pH of the starch to 5–7;

(7) washing and drying the starch;

(8) solubilizing 2–15% by weight of the pretreated starch, as calculated by weight of the final product, in a solvent having a temperature of 45°–70° C. to form a solution;

(9) adding salt and aroma proving substances to the solution;

c) preparing a fat phase by mixing substances selected from the group consisting of edible fats, edible oils and mixtures thereof at a temperature of 48°–70° C.;

d) directly forming a water in oil emulsion by emulsifying 62–85% by weight of the water phase at a temperature of 45°–60° C. in 38–15% by weight of the fat phase at a temperature of 48°–65° C.;

e) pasteurizing the emulsion at a temperature of 80°–85° C.; and f) cooling the pasteurized emulsion to 10°–15° C. and packing the final product.

2. The method of claim 1 wherein substep (1) is further characterized in that the diluted acid is diluted hydrochloric acid.

3. The method of claim 2 further characterized in that potato starch having a dry matter content of about 40% is suspended in a 1.5% hydrochloric acid solution.

4. The method of claim 1 wherein substep (7) is further characterized in that the starch is washed by means of water.

5. The method of claim 1 wherein substep (6) is further characterized in that the starch is treated by means of sodium hydroxide so that the pH value at a temperature of 25° C. is 8–8.5;

6. The method of claim 1 wherein substep (6) is further characterized in that the starch is treated by means of sodium hydroxide so that the pH value at a temperature of 40° C. is about pH=7.

7. The method of claim 1 wherein substep (8) is further characterized in that the solvent for the pretreated starch is selected from the group consisting of water, a milk product and vegetable protein.

8. The method of claim 7 wherein the milk product is selected from the group consisting of buttermilk, skim milk, soured (cultured) milk, cheese whey, yogurt and low concentrated milk protein.

9. The method of claim 17 wherein the vegetable protein is soy protein.

10. The method of claim 1 further characterized in that the starch is stabilized by reacting the starch with propylene oxide pH about 11–12 at a temperature of about 40° C.

11. The method of claim 1 wherein step c) is further characterized in that an emulsifier is added to the fat phase.

12. The method of claim 11 further characterized in that the emulsifier is a monoglyceride present in an amount of 0.25–2% by weight as calculated on the ready margarine.

13. The method of claim 1 wherein step a) is further characterized in that the starch has a dry matter content of 8–15% by weight as calculated on the final product for a margarine having a fat content of 15–25 percent by weight.

14. The method of claim 13 wherein the starch has a dry matter content of 10–12% by weight as calculated on the final product for a margarine having a fat content of 15–25 percent by weight.

15. The method of claim 1 wherein step a) is further characterized in that the starch has a dry matter content of is 2–8 percent by weight as calculated on the ready product for margarines having a fat content of 25–38 percent by weight.

16. The method of claim 1 further characterized in that a preservative is added to the water phase.

17. The method of claim 16 further characterized in that the preservative is potassium sorbate added in an amount of 0.03–0.06 % by weight of the final product.

18. The method of claim 1 further characterized in that a protein concentrate is added to the water phase.

19. The method of claim 1 wherein step d) is further characterized in that the water phase is emulsified in the fat phase by mechanical working.

20. The method of claim 1 wherein step d) is further characterized in that the water phase is successively emulsified in the fat phase by a slow injection of the water phase into the fat phase.

21. The method of claim 1 wherein step d) is further characterized in that water phase is emulsified batchwise phase in the fat phase in a mixing tank.

22. A low calorie margarine having a fat content between 15–38% by weight as calculated on the final product, said margarine comprising a water in oil emulsion wherein the emulsion comprises 62–85% by weight of a water phase and 38–15% of a fat phase, said water phase including a starch having a viscosity of 100–800 cp corresponding to a polymerization degree of more than 10,000, and having a functional group coupled thereto to stabilize the starch said functional group selected from the group consisting of an acetyl group, a 2 -olctenylsuccinyl group, a succinyl group and a hydroxi-propyl group, said fat phase including a mixture of substances selected from the group consisting of edible fats, edible oils and mixtures thereof.

23. The low calorie margarine of claim 22 wherein the starch has a dry matter content of 8–15% by weight as calculated on the final product for a margarine having a fat content of 15–25% by weight.

24. The low calorie margarine of claim 22 wherein the starch has a dry matter content of 2–8% by weight as calculated on the final product for a margarine having a fat content of 25–38% by weight.

25. The low calorie margarine of claim 22 wherein the fat phase further comprises an emulsifier.

26. The low calorie margarine of claim 22 wherein the emulsifier is a monoglyceride.

* * * * *